(No Model.) 2 Sheets—Sheet 2.
L. BORLAND & T. J. PARSONS.
GRAIN DRIER.
No. 361,126. Patented Apr. 12, 1887.
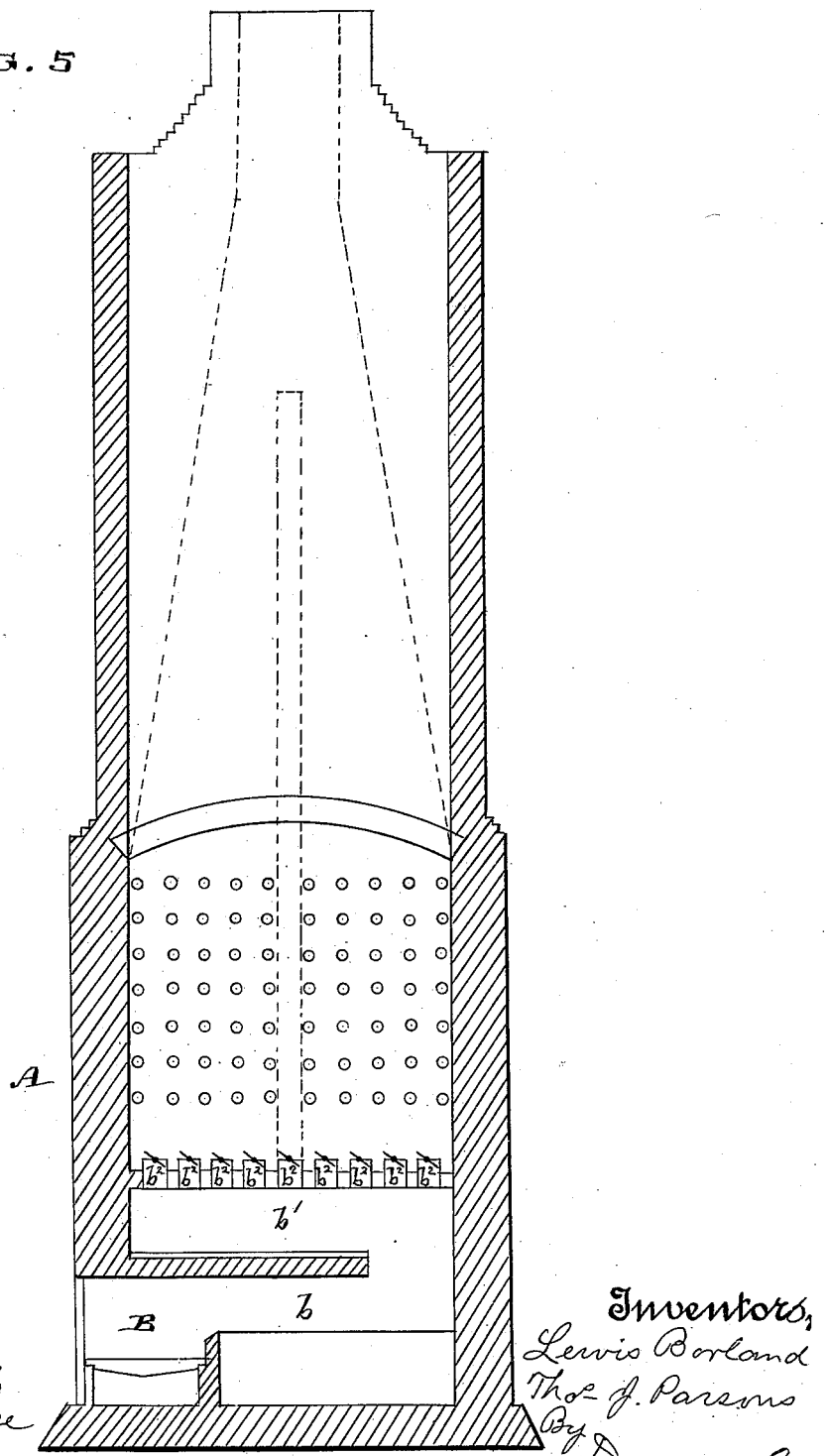

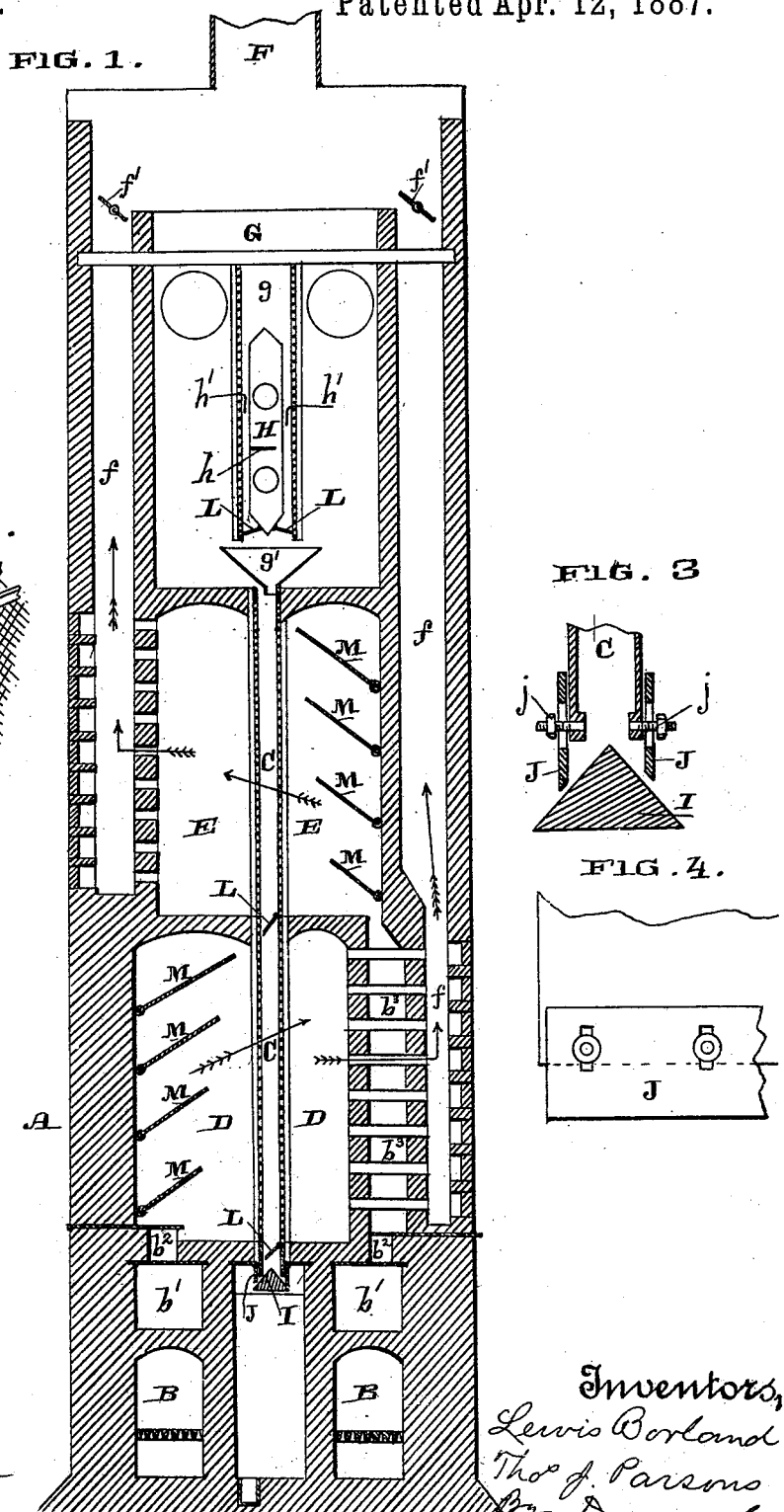

United States Patent Office.

LEWIS BORLAND AND THOMAS J. PARSONS, OF SAN FRANCISCO, CAL.

GRAIN-DRIER.

SPECIFICATION forming part of Letters Patent No. 361,126, dated April 12, 1887.

Application filed July 14, 1886. Serial No. 208,037. (No model.)

*To all whom it may concern:*

Be it known that we, LEWIS BORLAND and THOMAS J. PARSONS, both of the city and county of San Francisco, State of California, have invented an Improvement in Grain-Driers; and we hereby declare the following to be a full, clear, and exact description of the same.

Our invention relates to the class of grain-driers; and it consists in the constructions and combinations hereinafter described and claimed.

Referring to the accompanying drawings for a more complete explanation of our invention, Figure 1 is a vertical cross-section of our drier. Fig. 2 is a perspective detail of a portion of the grain-passage C. Fig. 3 is a detail section of the feeder I. Fig. 4 is a side elevation of the adjustable gates J. Fig. 5 is a vertical longitudinal section of the drier.

A is the shell of the drier, having in its base the fire chambers or boxes B, which communicate with direct flues $b$ and with return-flues $b'$ above.

C is the grain-passage, here shown in a vertical position and which passes down through the center of the shell of the drier, being formed by two parallel and spaced walls of suitable material—such as wire-cloth or perforated metal sheets—having a mesh small enough to confine the grain. On each side of this vertical passage are formed the hot-air chambers D of the lower series and the hot-air chambers E of the upper series.

It will be observed that one of the fire-chambers, through its return-flue and the valved or dampered short passages $b^2$, connects with one of the hot-air chambers of the lower series, while the other fire-chamber, through its return-flue, short passages $b^2$, and the vertical passage $b^3$, connects with the opposite one of the upper series of the hot-air chambers. The heated air will, of course, pass from the chamber into which it first enters through the grain in the passage C and into the other and opposing chamber, whence it escapes from both series of hot-air chambers through upright flues $f$ in the sides of the shell into the stack F. The upper ends of the flues $f$ have controlling-dampers $f'$, for regulating and equalizing the draft in each.

G is the garner or hopper the throat or discharge-passage $g$ of which is formed of screen material—such as wire-cloth or perforated metal—and which joins the top of the vertical passage C, either directly or through the intervention of a removable small hopper, $g'$. Within this throat is a heating drum or cylinder, H, which is supplied with steam from any suitable source, preferably the exhaust-steam from the engine.

The drum may be provided with a partial central transverse partition, $h$, dividing it into two compartments, into one of which steam is admitted and from the other of which it exhausts. The steam-drum is of a diameter enough smaller than the throat of the hopper in which it is situated to leave a circumscribing space or chamber, $h'$, around it for the passage of the grain into the vertical passage.

At the bottom of the passage is arranged the feeder I. This consists of a piece or strip having, in cross-section, the shape of an isosceles triangle, and this is mounted on suitable bearings, and is adapted to receive a longitudinal motion, by means of any suitable power device—such as eccentrics or cranks—unnecessary herein to show.

The base of the two walls of the vertical passage C approach to the sloping sides of the feeder-strip, and they have secured to them gates J, which are slotted, and receive bolts $j$, by which they may be raised up or moved down, so as to increase or diminish the capacity of the opening between them and the sloping sides of the feeder-strip. The grain passes down through the passage C upon the sloping sides of the feeder-strip, which, by its longitudinal motion, discharges it in regular and stated quantities into a suitable discharge-conveyer. The amount of this discharge is regulated by the adjustable gates J, heretofore described.

L are check-valves or gates, located in the base of the space $h'$ around the steam-drum H, and in the passage C, about midway of its height and at its base. These gates consist of pivoted plates operated from without; or they may be of any other suitable construction.

Within the hot-air chambers of both series into which the air is first admitted is a series of deflectors, M. These consist of plates hinged to the shell of the furnace at one end and adapted to be turned, by suitable means, (not here shown,) to any desired inclination. The lowermost deflector of the series is narrowest, and they increase in width according to their elevation. Their purpose is to divert the entering heat to any portion of the grain-passage C which may be desired, and by an even distribution to prevent it from accumulating at the top of the chamber, and thus avoid the result of having said top of a much higher temperature than the bottom. The object in increasing the width of the deflectors according to their elevation is that each may serve its function without interference from the one below.

The operation of our drier is as follows: The grain is put in the garner or hopper and thence passes down through its throat, completely encircling the steam-heater, so that in its passage it receives the necessary preliminary heat. The throat being perforated or foraminous, as described, provides an escape for the heat, so that condensation will not be formed and the grain will be left dry instead of moist. The grain passes down through the vertical passage, receiving heat from the upper series of chambers, E, and on each side of its body, and again receiving heat from the lower series of hot-air chambers, D, and on each side until it is thoroughly dried during the course of the progress. It finally falls upon the feeder I, from which it is discharged into the conveyer and carried away.

It will be observed that by the arrangement of the vertical grain-passage the entire operation of the drier is automatic, as the grain progresses by its own weight, thus avoiding the necessity of shoveling, which has usually to be done in the ordinary driers; and then, again, by the arrangement of hot-air chambers it will be seen that the grain as it passes the upper series receives the heat directly on one side, and as it passes the lower series receives it directly on the other side, so that it never has to be turned, as is the case where it lies upon a vertical pan. The object of the check-gates L is to shut off the progress of the grain at suitable points, when desired. We may have any number of hot-air chambers, arranged, as shown, upon each side of the vertical grain-passage. The short passages $b^2$, controlled by the dampers enables us to direct the heat from the return-flue into the chambers to the best advantage.

We do not confine ourselves to a vertical passage, C, as it may be arranged on an incline or in any manner in which the grain it contains will progress by gravity.

Having thus described our invention, what we claim as new, and desire to secure by Letters Patent, is—

1. In a grain-drier, the vertical passage C, having perforated or foraminous walls, in combination with a lower series of hot-air chambers, D, one on each side of the passage, the upper series of hot-air chambers, E, one on each side of the passage, fire-chambers communicating separately with one chamber of the upper and lower series on opposite sides, and escape-flues from the other chamber of said series, substantially as herein described.

2. In a grain-drier, the vertical passage C, having perforated or foraminous walls, the garner or hopper G, connecting with the top of the passage, the hot-air chambers D below and hot-air chambers E above, said chambers being arranged on each side of the passage, the fire-box B, having a return-flue, with damper-controlled passages $b^2$, communicating with one of the lower hot-air chambers, and the other fire-box B, having a return-flue with damper-controlled passages communicating with one of the upper hot-air chambers on the opposite side, and escape-flues from the chambers opposite those with which the fire-boxes communicate, substantially as herein described.

3. In a grain-drier, the vertical grain passage C, having foraminous or perforated walls, and the hot-air chambers D E on each side thereof, in combination with a series of swinging or adjustable deflector-plates, M, hinged to one side of the hot-air chambers, the plates of series increasing in width according to elevation, substantially as herein described.

4. A grain-drier comprising the shell A, the fire-chambers or boxes B, the hot-air chambers D E, the lowermost communicating with the passages of one fire-chamber and the uppermost with those of the other fire-chamber, escape-flues in opposite sides of the shell, the vertical grain-passage C between the hot-air chambers, and having perforated or foraminous walls, the hopper G, having a foraminous throat or discharge, g, in communication with a vertical passage, the steam-heater H in the throat of the hopper and around which the grain passes, and the adjustable deflector-plates M within the hot-air chambers, all arranged and adapted to operate substantially as herein described.

In witness whereof we have hereunto set our hands.

LEWIS BORLAND.
THOMAS J. PARSONS.

Witnesses:
C. D. COLE,
J. H. BLOOD.